United States Patent [19]

Nakano et al.

[11] Patent Number: 5,873,047
[45] Date of Patent: Feb. 16, 1999

[54] METHOD FOR SETTING UP PERCH CHANNELS IN MOBILE COMMUNICATION BY CELLULAR SYSTEM

[75] Inventors: Etsuhiro Nakano, Yokosukashi; Narumi Umeda, Yokohamashi, both of Japan

[73] Assignee: NTT Mobile Communications Network Inc., Tokyo, Japan

[21] Appl. No.: 728,498

[22] Filed: Oct. 9, 1996

[30] Foreign Application Priority Data

Oct. 19, 1995 [JP] Japan .................................. 7-271018

[51] Int. Cl.$^6$ ......................................... H04B 1/00
[52] U.S. Cl. .......................... 455/561; 455/446; 455/452
[58] Field of Search .................... 455/446, 434, 455/438, 452, 515, 513, 561

[56] References Cited

U.S. PATENT DOCUMENTS

| | | | |
|---|---|---|---|
| 4,771,448 | 9/1988 | Koohgoli et al. | 455/452 |
| 5,203,008 | 4/1993 | Yasuda et al. | 455/452 |
| 5,257,398 | 10/1993 | Schaeffer | 455/452 |
| 5,475,868 | 12/1995 | Duque-Anton et al. | 455/452 |
| 5,577,022 | 11/1996 | Padovani et al. | 370/13 |
| 5,584,049 | 12/1996 | Weaver, Jr. et al. | 455/67.5 |
| 5,594,943 | 1/1997 | Balachandran | 455/513 |
| 5,640,414 | 6/1997 | Blakeney, II et al. | 375/200 |
| 5,666,655 | 9/1997 | Ishikawa et al. | 455/512 |
| 5,673,260 | 9/1997 | Umeda et al. | 370/342 |

FOREIGN PATENT DOCUMENTS 2-222221   9/1990   Japan .

*Primary Examiner*—Reinhard J. Eisenzopf
*Assistant Examiner*—Makoto Aoki
*Attorney, Agent, or Firm*—Oblon, Spivak, McClelland, Maier & Neustadt, P.C.

[57] ABSTRACT

A method for setting up perch channels in a mobile communication by a cellular system, capable of setting up a perch channel and a perch channel list for surrounding base stations at each newly provided base station autonomously. At the newly provided base station, reception levels of signals transmitted by mobile stations to surrounding base stations are measured by scanning uplink control channels corresponding to perch channels, and a perch channel of the newly provided base station and a perch channel list to be signaled by the newly provided base station are autonomously set according to the measured reception levels. Alternatively, reception levels of signals transmitted through perch channels by surrounding base stations are measured while receiving perch channel lists signaled by the surrounding base stations, and a perch channel of the newly provided base station and a perch channel list to be signaled by the newly provided base station are autonomously set according to the measured reception levels and the received perch channel lists of the surrounding base stations.

25 Claims, 8 Drawing Sheets

| PERCH CHANNEL | FREQUENCY FOR HAVING UPLINK CHANNEL RECEPTION LEVEL OVER TH1(0dB) | FREQUENCY FOR HAVING UPLINK CHANNEL RECEPTION LEVEL OVER TH3(10dB) |
|---|---|---|
| PC1 | 0% | 0% |
| PC2 | 80% | 40% |
| PC3 | 60% | 30% |
| PC4 | 20% | 5% |
| PC5 | 50% | 20% |
| PC6 | 30% | 5% |
| PC7 | 0% | 0% |
| ⋮ | ⋮ | ⋮ |

FIG.5

| PERCH CHANNEL PC3 | ← THIS STATION'S PERCH CHANNEL |
| PERCH CHANNEL PC19 | |
| PERCH CHANNEL PC8 | |
| PERCH CHANNEL PC2 | SURROUNDING BASE STATION'S PERCH CHANNELS |
| PERCH CHANNEL PC13 | |
| PERCH CHANNEL PC6 | |
| PERCH CHANNEL PC7 | |

FIG.6

| PERCH CHANNEL | FREQUENCY FOR HAVING UPLINK CHANNEL RECEPTION LEVEL OVER TH1(0dB) | FREQUENCY FOR HAVING UPLINK CHANNEL RECEPTION LEVEL OVER TH3(10dB) |
|---|---|---|
| PC1 | 0% | 0% |
| PC2 | 80% | 40% |
| PC3 | 60% | 30% |
| PC4 | 20% | 5% |
| PC5 | 50% | 20% |
| PC6 | 30% | 5% |
| PC7 | 0% | 0% |
| ⋮ | ⋮ | ⋮ |

FIG.7

| PERCH CHANNEL | FREQUENCY FOR HAVING UPLINK CHANNEL RECEPTION LEVEL OVER TH3(10dB) |
|---|---|
| PC1 | 18% |
| PC2 | |
| PC3 | 30% |
| PC4 | 25% |
| PC5 | 5% |
| PC6 | 20% |
| PC7 | 0% |
| ⋮ | ⋮ |

FIG.8

| PERCH CHANNEL | BASE STATION ID | FREQUENCY FOR HAVING UPLINK CHANNEL RECEPTION LEVEL OVER TH1(0dB) | FREQUENCY FOR HAVING UPLINK CHANNEL RECEPTION LEVEL OVER TH3(10dB) |
|---|---|---|---|
| PC1 | | 0% | 0% |
| PC2 | 116544 | 80% | 40% |
| PC3 | 165497 | 60% | 30% |
| PC4 | | 20% | 5% |
| PC5 | 164842 | 50% | 20% |
| PC6 | | 30% | 5% |
| PC7 | | 0% | 0% |
| ⋮ | ⋮ | ⋮ | ⋮ |

FIG.9

| BASE STATION COORDINATES | PERCH CHANNEL |
|---|---|
| (1576,6858) | PC2 |
| (7846,995) | PC12 |
| (1581,8192) | PC6 |
| (7562,1687) | PC4 |
| (2165,4864) | PC7 |
| (3564,968) | PC6 |
| (4336,5641) | PC2 |
| (1974,6547) | PC5 |
| ⋮ | ⋮ |

FIG.10

| PERCH CHANNEL | PERCH CHANNEL RECEPTION LEVEL | PERCH CHANNEL LIST |
|---|---|---|
| PC1 | -5dB | |
| PC2 | 20dB | PC2,3,4,6,8 |
| PC3 | 15dB | PC3,2,4,10,12 |
| PC4 | 3dB | |
| PC5 | 12dB | PC5,2,6,12,15 |
| PC6 | 8dB | PC6,1,2,5,11 |
| PC7 | -5dB | |
| ⋮ | ⋮ | ⋮ |

FIG.11

| PERCH CHANNEL | PERCH CHANNEL RECEPTION LEVEL | PERCH CHANNEL LIST |
|---|---|---|
| PC1 | -5dB | |
| PC2 | 20dB | PC2,3,4,6,8 |
| PC3 | 15dB | PC3,2,4,10,12 |
| PC4 | 3dB | |
| PC5 | 12dB | PC5,2,6,12,15 |
| PC6 | 8dB | |
| PC7 | -5dB | |
| ⋮ | ⋮ | ⋮ |

FIG.12

| PERCH CHANNEL | PERCH CHANNEL RECEPTION LEVEL |
|---|---|
| PC1 | 20dB |
| PC2 | |
| PC3 | 12dB |
| PC4 | 13dB |
| PC5 | 8dB |
| PC6 | 15dB |
| PC7 | -5dB |
| PC8 | 16dB |
| ⋮ | ⋮ |

METHOD FOR SETTING UP PERCH CHANNELS IN MOBILE COMMUNICATION BY CELLULAR SYSTEM

BACKGROUND OF THE INVENTION

1. Field of the Invention

The present invention relates to a method for setting up a perch channel to be allocated to each base station in a mobile communication by a cellular system in which a plurality of service areas are provided by a plurality of base stations.

2. Description of the Background Art

In the cellular system, a perch channel is allocated to each base station, and each base station carries out a signal transmission through the allocated perch channel as well as a signaling of perch channel list for surrounding base stations. A mobile station measures reception levels of perch channels, and makes a selection of the closest base station and a selection of a moving destination base station according to the measured reception levels. After the perch channel list for surrounding base stations is received at the mobile station, the perch channels for which the reception level measurement must be carried out by the mobile station can be narrowed down, so that it becomes possible to carry out the reception level measurement at high precision in short time. A standard for utilization of perch channels in cellular systems is described in "Personal Digital Cellular Telecommunication System Standard RCR STD-27."

However, when the mobile station does not have the perch channel list for surrounding base stations, there is a need to carry out the reception level measurement for all the perch channels. In order to shorten the time required for this reception level measurement, the cellular system adopts a scheme for arranging perch channels by reusing the same perch channel at different service areas so as to reduce a number of perch channels.

In arranging the perch channels, there is a need to arrange the identical perch channels with a sufficient distance provided therebetween so as to prevent an interference between the identical perch channels. In the conventional cellular system, such a setting of the perch channels has been made by a system designer. In an initial arrangement at a time of system design, the propagation characteristics are estimated according to the geographical conditions, and the identical perch channels are arranged with a sufficient reuse distance therebetween for preventing a mutual interference. In addition, a perch channel list for surrounding base stations to be signaled by each base station is also set up. Also, at a time of providing a new base station, an available perch channel is selected and a perch channel list for surrounding base stations is set up, according to the utilization state of the perch channels at the surrounding base stations.

Now, it is expected that a subscriber capacity required for the cellular system will continue to increase, and there will be a constant need to provide a new base station according to the increasing demand. In the conventional perch channel set up method, the perch channels are to be set up by a system designer every time a new base station is provided, so that there has been a drawback regarding a considerable amount of work load required for the system designer.

In addition, the propagation characteristics are not actually measured but only estimated, so that there has been a possibility for the perch channels to interfere with each other.

SUMMARY OF THE INVENTION

It is therefore an object of the present invention to provide a method for setting up perch channels in a mobile communication by a cellular system, capable of setting up a perch channel and a perch channel list for surrounding base stations at each newly provided base station autonomously and distributedly in accordance with the actual propagation states, without requiring an extra work load on a system designer.

It is another object of the present invention to provide a base station apparatus suitable for a newly provided base station in the above method for setting up perch channels in a mobile communication by a cellular system.

It is another object of the present invention to provide a base station apparatus suitable for an already operating base station in the above method for setting up perch channels in a mobile communication by a cellular system.

According to one aspect of the present invention there is provided a method for setting up perch channels in a mobile communication by a cellular system having a plurality of base stations including a newly provided base station and mobile stations, the method comprising the steps of: measuring reception levels of signals transmitted by mobile stations to surrounding base stations at the newly provided base station by scanning uplink control channels corresponding to perch channels; and setting a perch channel of the newly provided base station and a perch channel list to be signaled by the newly provided base station, autonomously at the newly provided base station, according to the reception levels measured at the measuring step.

According to another aspect of the present invention there is provided a method for setting up perch channels in a mobile communication by a cellular system having a plurality of base stations including a newly provided base station and mobile stations, the method comprising the steps of: measuring reception levels of signals transmitted through perch channels by surrounding base stations at the newly provided base station while receiving perch channel lists signaled by the surrounding base stations; and setting a perch channel of the newly provided base station and a perch channel list to be signaled by the newly provided base station, autonomously at the newly provided base station, according to the reception levels and the perch channel lists of the surrounding base stations obtained at the measuring step.

According to another aspect of the present invention there is provided a base station apparatus to be used as a newly provided base station in a mobile communication by a cellular system having a plurality of base stations and mobile stations, the apparatus comprising: transmitter and receiver means for realizing functions of a base station in the cellular system; measurement means for measuring reception levels of signals transmitted by mobile stations to surrounding base stations by scanning uplink control channels corresponding to perch channels; and control means for setting a perch channel of the newly provided base station and a perch channel list to be signaled by the newly provided base station, autonomously at the newly provided base station, according to the reception levels measured by the measurement means.

According to another aspect of the present invention there is provided a base station apparatus to be used as an already operating base station in a mobile communication by a cellular system having a plurality of base stations including a newly provided base station and mobile stations, the apparatus comprising: transmitter and receiver means for realizing functions of a base station in the cellular system; measurement means for measuring reception levels of signals transmitted by mobile stations to surrounding base stations by scanning uplink control channels corresponding to perch channels; and control means for re-setting a perch channel list to be signaled by said already operating base station, by obtaining a frequency for having a measured reception level over a prescribed threshold value TH3 for each uplink control channel, and setting perch channels corresponding to those uplink control channels for which the obtained frequency is over a prescribed threshold value TH4 into the perch channel list to be signaled by said already operating base station.

According to another aspect of the present invention there is provided a base station apparatus to be used as an already operating base station in a mobile communication by a cellular system having a plurality of base stations including a newly provided base station and mobile stations, the apparatus comprising: transmitter and receiver means for realizing functions of a base station in the cellular system; measurement means for measuring reception levels of signals transmitted through perch channels by surrounding base stations; and control means for re-setting a perch channel list to be signaled by said already operating base station, by setting perch channels for which a measured reception level is over a prescribed threshold value TH7 into the perch channel list to be signaled by said already operating base station.

According to another aspect of the present invention there is provided a base station apparatus to be used as a newly provided base station in a mobile communication by a cellular system having a plurality of base stations and mobile stations, the apparatus comprising: transmitter and receiver means for realizing functions of a base station in the cellular system; measurement means for measuring reception levels of signals transmitted through perch channels by surrounding base stations while receiving perch channel lists signaled by the surrounding base stations; and control means for setting a perch channel of the newly provided base station and a perch channel list to be signaled by the newly provided base station, autonomously at the newly provided base station, according to the reception levels and the perch channel lists of the surrounding base stations obtained by the measurement means.

Other features and advantages of the present invention will become apparent from the following description taken in conjunction with the accompanying drawings.

BRIEF DESCRIPTION OF THE DRAWINGS

FIG. 5 is an illustration of an exemplary perch channel list of a base station at a shared cell in a diagram of FIG. 4.

FIG. 6 is an illustration of an exemplary content in a measurement table of a newly provided base station according to the first embodiment of the present invention.

FIG. 7 is an illustration of an exemplary content in a measurement table of an already operating base station according to the first embodiment of the present invention.

FIG. 8 is an illustration of another exemplary content in a measurement table of a newly provided base station according to the first embodiment of the present invention.

FIG. 9 is an illustration of an exemplary correspondence table provided at a communication network according to the first embodiment of the present invention.

FIG. 10 his an illustration of another exemplary content in a measurement table of each base station according to the first embodiment of the present invention.

FIG. 11 is an illustration of an exemplary content in a measurement table of a newly provided base station according to the second embodiment of the present invention.

FIG. 12 is an illustration of an exemplary content in a measurement table of an already operating base station according to the second embodiment of the present invention.

DETAILED DESCRIPTION OF THE PREFERRED EMBODIMENTS

Referring now to FIG. 1 to FIG. 10, the first embodiment of a method for setting up perch channels in a mobile communication by a cellular system according to the present invention will be described in detail.

Figure 1:
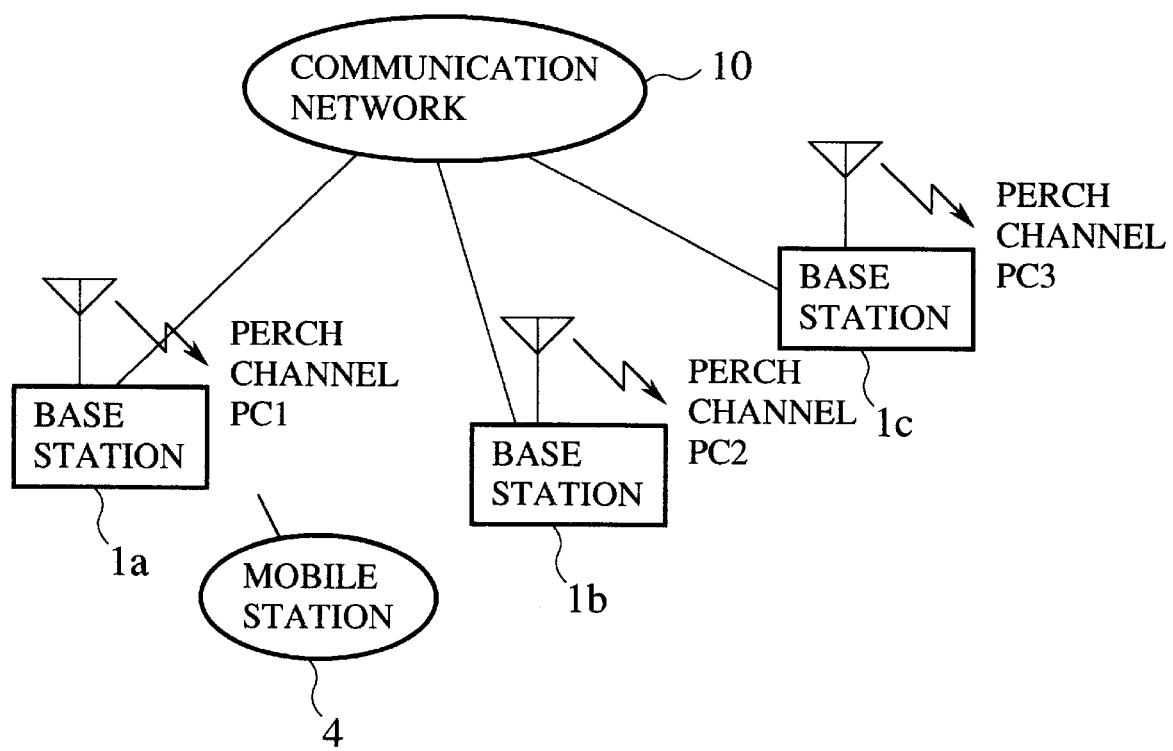
FIG. 1 is a schematic block diagram of a radio communication system to which a method for setting up perch channels in a mobile communication by a cellular system according to the present invention is applied.

FIG. 1 shows a configuration of a radio communication system to which a method for setting up perch channels in a mobile communication by a cellular system according to the present invention is applied.

This radio communication system of FIG. 1 has a plurality of base stations 1 (1a, 1b, 1c) connected through a communication network 10, where a mobile station 4 is set in communication by being connected with a base station 1a through a radio channel, for example. In general, a plurality of mobile stations 4 are present in the system.

Figure 4:
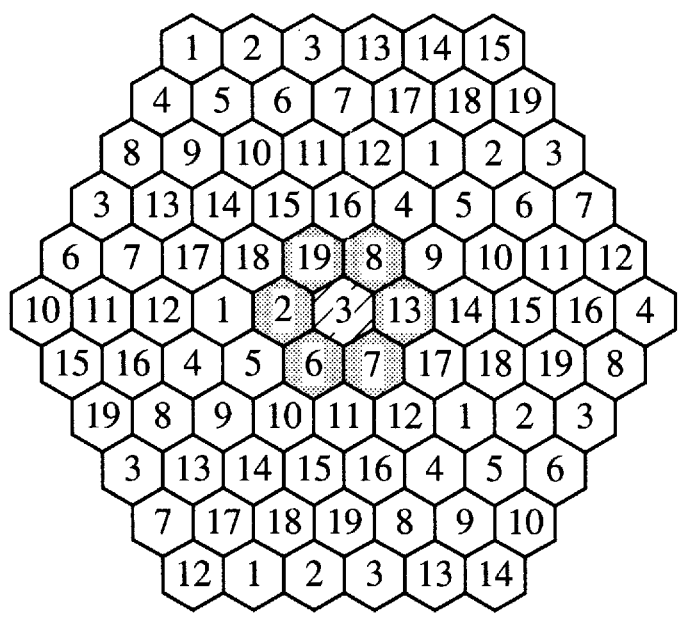
FIG. 4 is a diagram showing an exemplary perch channel arrangement among base stations that can be used in the present invention.

Each of the base stations 1a, 1b and 1c is allocated with a perch channel (PC1, PC2 and PC3, respectively) which is a channel to be used in carrying out a level measurement at the mobile station 4, and each base station 1 is transmitting signals through the respective perch channel. Here, the perch channels are arranged as shown in FIG. 4, for example, so that the identical perch channels do not interfere with each other. In FIG. 4, a number assigned to each cell indicates a perch channel number. For instance, a central shared cell is allocated with the perch channel PC3.

In addition, each base station 1 also carries out a signaling of a perch channel list. FIG. 5 shows an exemplary perch channel list signaled by a base station of a shared cell indicated in FIG. 4, which includes the perch channel of this base station followed by the perch channels of the surrounding base stations. By receiving this perch channel list, the mobile station 4 can learn the perch channels through which signals are transmitted by the surrounding base stations.

Figure 2:
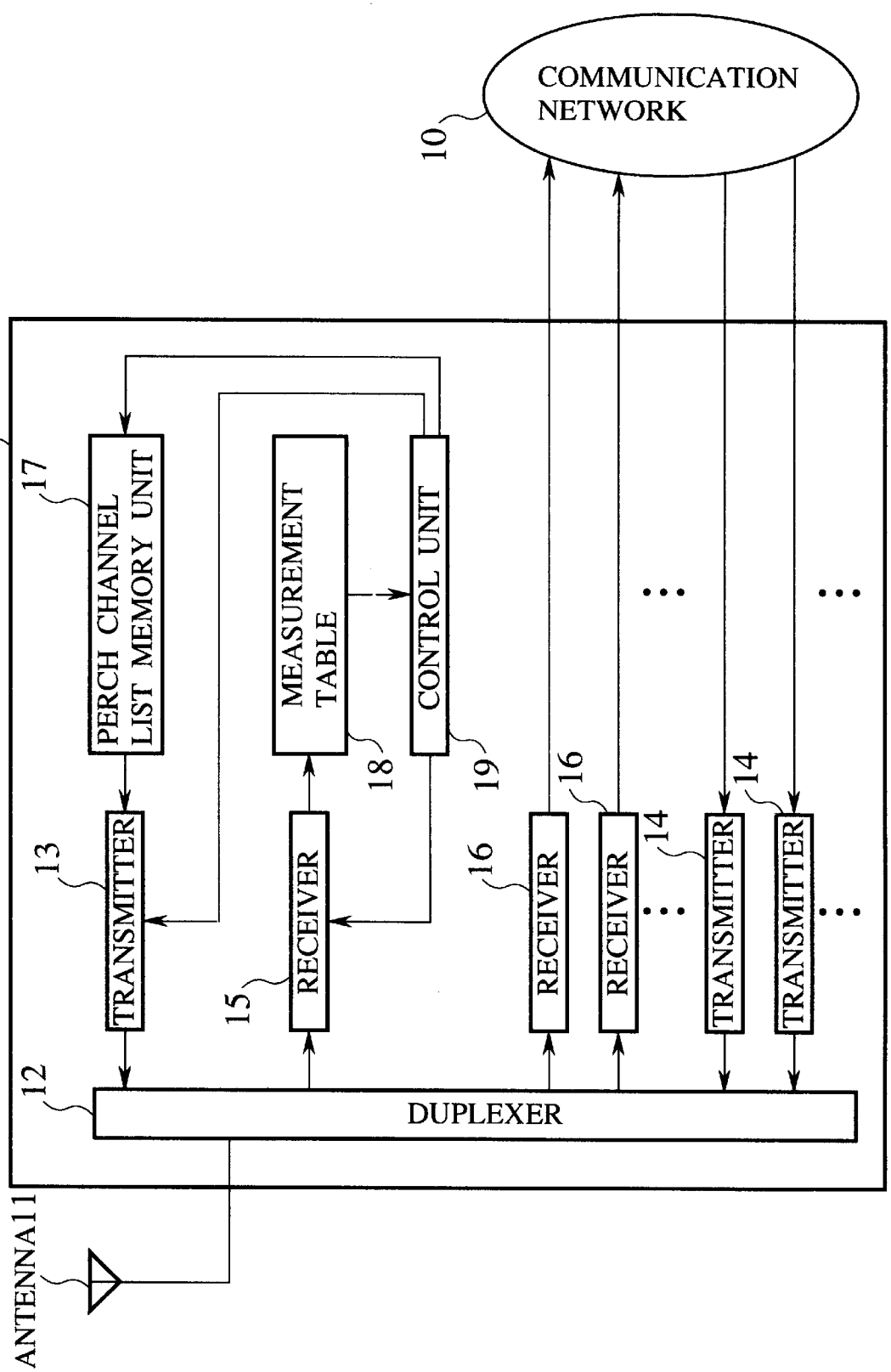
FIG. 2 is a block diagram of each base station in the radio communication system of FIG. 1.

FIG. 2 shows a detailed configuration of each base station 1 in the system of FIG. 1. The base station 1 of FIG. 2 comprises: an antenna 11 for carrying out radio communications with the mobile stations 4; duplexer 12 connected with the antenna 11; transmitters 13 and 14 and receivers 15 and 16, all connected with the duplexer 12, where the transmitters 14 and the receivers 16 are also connected with the communication network 10; a perch channel list memory unit 17 connected with the transmitter 13; a measurement table 18 connected with the receiver 15; and a control unit 19 connected with the transmitter 13, the receiver 15, the perch channel list memory unit 17 and the measurement table 18, for controlling the operation in this base station 1.

The transmitter 13 carries out the signaling of the perch channel list stored in the perch channel list memory unit 17.

In this embodiment, the signaling of the perch channel list is carried out through the perch channel, but it is also possible to carry out this signaling of the perch channel list through another channel by providing another transmitter.

The receiver 15 receives the perch channels through which signals are transmitted by the surrounding base stations and carries out a level measurement of each received perch channel, while receiving the perch channel list signaled by each of the surrounding base stations. Also, the receiver 15 may receive uplink (i.e., from a mobile station to a base station) control channels through which signals are transmitted by the mobile stations 4, and carry out a level measurement of each received uplink control channel. The measurement result obtained by the receiver 15 is stored in the measurement table 18.

The control unit 19 carries out a control of the receiver 15, an analysis of the measurement table 18, a designation of the perch channel through which signals are to be transmitted by the transmitter 13, and a designation of the perch channel list to be stored in the perch channel list memory unit 17.

The transmitters 14 and the receivers 16 are used for communications with respect to a plurality of mobile stations 4 by the base station 1. Communication data signals received by the receivers 16 are sent to the communication network 10, while communication data signals sent from the communication network 10 are transmitted from the transmitters 14.

The duplexer 12 is provided to use the single antenna 11 for both transmission and reception purposes.

Figure 3:
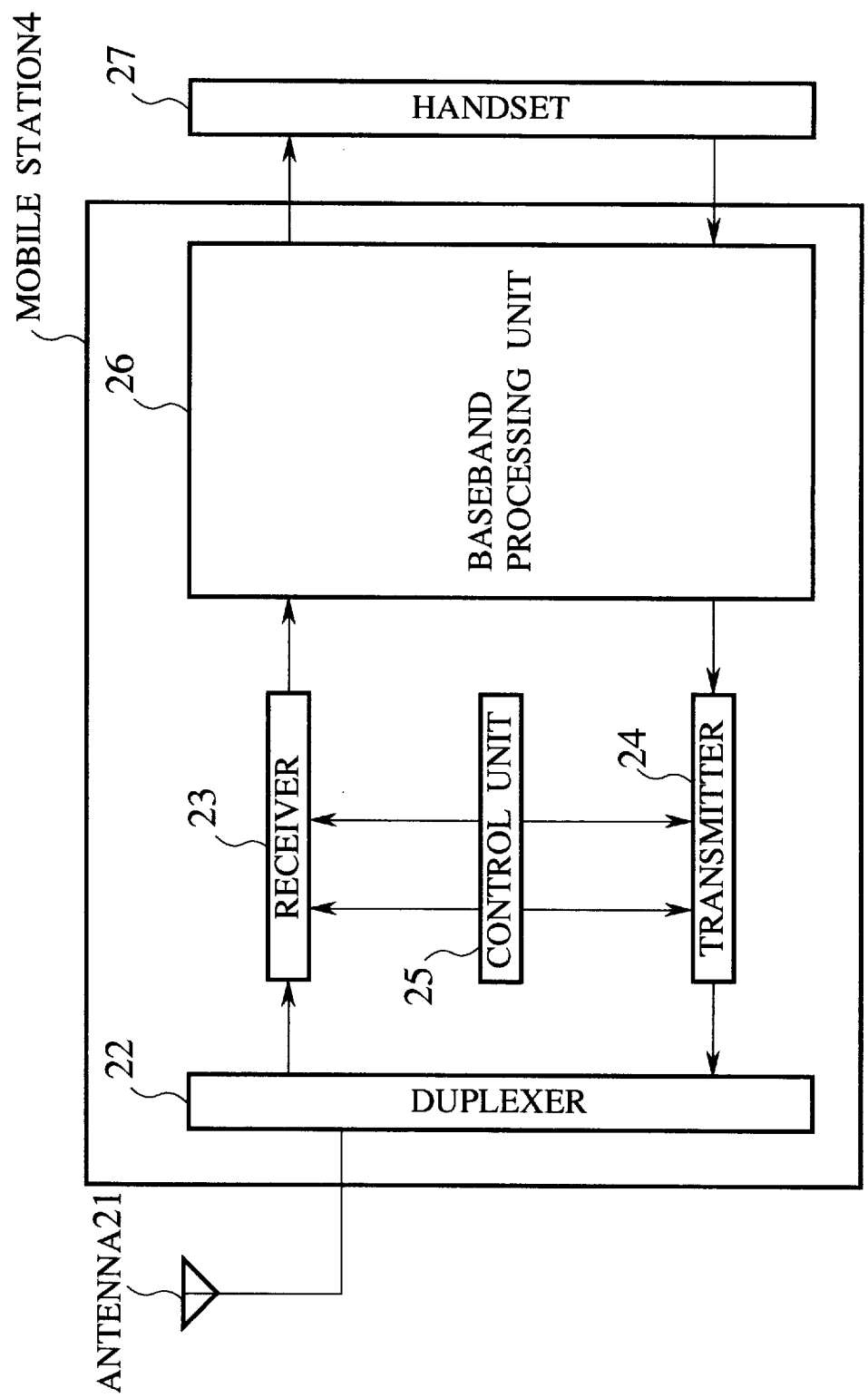
FIG. 3 is a block diagram of a mobile station in the radio communication system of FIG. 1.

FIG. 3 shows a detailed configuration of the mobile station 4 in the system of FIG. 1. The mobile station 4 of FIG. 3 comprises: an antenna 21 for carrying out radio communications with the base station 1; a duplexer 22 connected with the antenna 21; a receiver 23 and a transmitter 24 connected with the duplexer 22; a control unit 25 for controlling the receiver 23 and the transmitter 24, a baseband processing unit 26 connected with the receiver 23 and the transmitter 24; and a handset 27 connected to the baseband processing unit 26.

The receiver 23 receives the perch channels through which signals are transmitted by the base stations 1, the perch channel lists signaled by the base stations 1, as well as communication data signals.

The transmitter transmits control signals through an uplink control channel as well as communication data signals.

The control unit 25 controls the receiver 23 and the transmitter 24 so as to exchange control signals with the base station 1. The communication data signals received by the receiver 23 are converted into speech signals at the baseband processing unit 26 and sent to the handset 27. Speech signals sent from the handset 27 are converted into communication data signals at the baseband processing unit 26 and transmitted from the transmitter 24.

The duplexer 22 is provided to use the single antenna 21 for both transmission and reception purposes.

Next, the operation of the system of FIG. 1 having a configuration as described above in a case of providing a new base station according to this first embodiment will be described.

At a newly provided base station 1, the control unit 19 commands the receiver 15 to carry out the reception level measurement of uplink control channels corresponding to all the perch channels. In response, the receiver 15 repeatedly carries out the reception level measurement of each uplink control channel, and measures a frequency for having the reception level over a prescribed threshold value TH1 (which is set equal to 0 dB in this embodiment) and a frequency for having the reception level over a prescribed threshold value TH3 (which is set equal to 10 dB in this embodiment).

As a measurement method to be used here, it is possible to use a method in which the reception level measurement of each uplink control channel is carried out for a prescribed period of time or for a prescribed number of times, and how many percent of the measured reception levels exceeds each threshold value is measured. As exemplary measurement result stored in the measurement table 18 after this reception level measurement is shown in FIG. 6.

Then, according to this measurement table 18, the control unit 19 sets up the perch channel of this base station and the perch channel list to be signaled by this base station, as follows.

First, the perch channel of this base station is selected from the perch channels corresponding to the uplink control channels for which the frequency for having the reception level over the threshold value TH1 (0 dB) is not over a prescribed threshold value TH2 (which is set equal to 2% in this embodiment). In an exemplary case shown in FIG. 6, the perch channel of this base station is selected from the perch channels PC1, PC7, etc., by excluding the perch channels PC2, PC3, PC4, PC5 and PC6 corresponding to the uplink control channels for which the frequency for having the reception level over the threshold value TH1 is greater than the threshold value TH2. For instance, the perch channel PC1 can be selected as the perch channel for this base station. The determined perch channel of this base station is then specified to the transmitter 13.

Next, the control unit 19 sets the perch channels corresponding to the uplink control channels for which the frequency for having the reception level over the threshold value TH3 (10 dB) is over a prescribed threshold value TH4 (which is set equal to 10% in this embodiment) in the perch channel list to be signaled by this base station. In an exemplary case shown in FIG. 6, the perch channels PC2, PC3 and PC5 are set in the perch channel list to be signaled by this base station. The determined perch channel list is then notified to the perch channel list memory unit 17 and stored therein.

After the perch channel of this base station and the perch channel list to be signaled by this base station are set up as described above, the normal operation of this newly provided base station is started.

When the normal operation of this newly provided base station is started, the perch channel of this newly provided base station is automatically entered into the perch channel list of each surrounding base station as the reception level measurement is carried out similarly at each surrounding base station.

For example, suppose that a certain already operating base station which is transmitting signals through the perch channel PC2 has the perch channel list containing the perch channels PC2, PC3, PC4 and PC6, and when the normal operation of the newly provided base station is started, the mobile station carries out the signal transmission through the uplink control channel to that newly provided base station, so that the content of the measurement table 18 in this certain base station is changed as shown in FIG. 7. In this case, the perch channel list of this certain base station will be changed to contain the perch channels PC2, PC1, PC3, PC4 and PC6.

Note that, at this point, it is also possible for the surrounding base stations to use the perch channel setting in a manner of the second embodiment which will be described in detail below.

It is also possible to realize this change of the perch channel list at each surrounding base station by using a notification through a network. Namely, the newly provided base station notifies an addition of the perch channel PC1 of this base station in the perch channels list to each of the surrounding base stations corresponding to the perch channel PC2, PC3 and PC5 contained in the perch channel list of this base station. In response, the perch channel list of the base station which is transmitting signals through the perch channel PC2 will be changed from that containing the perch channels PC2, PC3, PC4 and PC6 to that containing the perch channels PC2, PC1, PC3, PC4 and PC6, for example.

Here, as a method for identifying the base station from the perch channel, it is possible to use a method in which a source base station ID in inserted into signals through the uplink control channel, so that the source base station ID is also stored along with the reception level measurement result as shown in FIG. 8. Alternatively, it is also possible to use a method in which a correspondence table registering the base station coordinates and the perch channel for each base station in correspondence as shown in FIG. 9 is provided in the communication network 10, and the notification is made with respect to each base station having a distinct perch channel which is located at a closest position to the newly provided base station among those base stations to which the identical perch channel is allocated.

It is also possible to carry out the reception level measurement of the uplink control channel by the following procedure.

Namely, at a time of carrying out the measurement to determine the arrangement of the perch channels of the surrounding base stations at each of the newly provided base station and the already operating base stations, the control unit 19 commands the receiver 15 to carry out the reception level measurement of all the perch channels, and the measurement result obtained by the receiver 15 is stored in the measurement table 18.

After the reception level measurement of all the perch channels is completed, the control unit 19 reads the measurement table 18, and commands the receiver 15 to receive the perch channel list of each base station for which the perch channel reception level is over a prescribed threshold value TH9 (which is set equal to 5 dB in this embodiment). The receiver 15 then receives the specified perch channel lists, and stores the received perch channel lists in the measurement table 18. An exemplary content stored in the measurement table 18 at this point is shown in FIG. 10.

Then, according to this measurement table 18, the control unit 19 commands the receiver 15 to carry out the reception level measurement of the uplink control channels corresponding to the perch channels PC2, PC3, PC4, PC5 and PC6 for which the perch channel reception level is over a prescribed threshold value TH8 (which is set equal to 0 dB in this embodiment) and the perch channels PC1, PC8, PC10, PC11, PC12 and PC15 which are contained in the perch channel lists of the base stations for which the perch channel reception level is over the threshold value TH9 (5 dB). In response, the receiver 15 carries out the reception level measurement of the specified uplink control channels by the similar procedure as described above.

Then, the setting of the perch channel of this base station and the setting/re-setting of the perch channel list to be signaled by this base station are carried out, similarly as described above.

Referring now to FIG. 11 and FIG. 12, the second embodiment of a method for setting up perch channels in a mobile communication by a cellular system according to the present invention will be described in detail.

In this second embodiment, configurations of the radio communication system, the base station and the mobile station are the same as those shown in FIG. 1, FIG. 2 and FIG. 3 described above.

In the following, the operation of the system of FIG. 1 in a case of providing a new base station according to this second embodiment will be described.

At a newly provided base station 1, the control unit 19 commands the receiver 15 to carry out the reception level measurement of all the perch channels, and the measurement result obtained by the receiver 15 is stored in the measurement table 18.

After the reception level measurement of all the perch channels is completed, the control unit 19 reads the measurement table 18, and commands the receiver 15 to receive the perch channel list of each base station for which the perch channel reception level is over a prescribed threshold value TH6 (which is set equal to 10 dB in this embodiment). The receiver 15 then receives the specified perch channel lists, and stores the received perch channel lists in the measurement table 18. An exemplary content stored in the measurement table 18 at this point is shown in FIG. 11.

Then, according to this measurement table 18, the control unit 19 sets up the perch channel of this base station and the perch channel list to be signaled by this base station, as follows.

First, the perch channel of this base station is selected from the perch channels other than those for which the reception level is over a prescribed threshold value TH5 (which is set equal to 0 dB in this embodiment) and those contained in the perch channel lists of the perch channels for which the reception level is over the threshold value TH6 (10 dB). In an exemplary case shown in FIG. 11, the perch channel of this base station is selected from the perch channels PC1, PC7, etc., by excluding the perch channels PC2, PC3, PC4, PC5 and PC6 for which the reception level is over the threshold value TH5, and the perch channels PC8, PC10, PC12 and PC15 which are contained in the perch channels (PC2, PC3 and PC5) for which the reception level is over the threshold value TH6. For instance, the perch channel PC1 can be selected as the perch channel for this base station. The determined perch channel of this base station is then specified to the transmitter 13.

Next, the control unit 19 sets the perch channels for which the reception level is over a prescribed threshold value TH7 (which is set equal to 10 dB in this embodiment) in the perch channel list to be signaled by this base station. In an exemplary case shown in FIG. 11, the perch channels PC2, PC3 and PC5 are set in the perch channel list to be signaled by this base station. The determined perch channel list is then notified to the perch channel list memory unit 17 and stored therein.

After the perch channel of this base station and the perch channel list to be signaled by this base station are set up as described above, the normal operation of this newly provided base station is started.

When the normal operation of this newly provided base station is started, the perch channel of this newly provided base station is automatically entered into the perch channel list of each surrounding base station.

For example, suppose that a certain already operating base station which is transmitting signals through the perch channel PC2 has the perch channel list containing the perch channels PC2, PC3, PC4, PC6 and PC8, and when the normal operation of the newly provided base station is started, the content of the measurement table 18 in this certain base station is changed as shown in FIG. 12. In this case, the perch channel list of this certain base station will be changed to contain the perch channels PC2, PC1, PC3, PC4, PC6 and PC8.

In this second embodiment, similarly as in the first embodiment, it is also possible to realize this change of the perch channel list at each surrounding base station by using a notification through a network. Namely, the newly provided base station notifies an addition of the perch channel PC1 of this base station in the perch channels list to each of the surrounding base stations corresponding to the perch channel PC2, PC3 and PC5 contained in the perch channel list of this base station. In response, the perch channel list of the base station which is transmitting signals through the perch channel PC2 will be changed from that containing the perch channels PC2, PC3, PC4, PC6 and PC8 to that containing the perch channels PC2, PC1, PC3, PC4, PC6 and PC8, for example.

Note that, in the first and second embodiments described above, when the FDMA (Frequency Division Multiple Access) scheme is used, each channel is divided in terms of frequencies, and at a time of reception level measurement, frequencies of the receiver are tuned to frequencies corresponding to a desired channel. When the TDMA (Time Division Multiple Access) scheme is used, each channel is divided in terms of times, and at a time of reception level measurement, reception timings of the receiver are tuned to timings corresponding to a desired channel. When the CDMA (Code Division Multiple Access) scheme is used, each channel is divided in terms of codes, and at a time of reception level measurement, correlators of the receiver are tuned to codes corresponding to a desired channel. Also, in a case of using the CDMA scheme, the signal transmission at each already operating base station is to be stopped when the perch channels through which signals are transmitted by the surrounding base stations and the signaling information (perch channel lists) signaled by the surrounding base stations are to be received.

Note also that, in the first and second embodiments described above, the threshold values TH1 to TH9 should preferably be determined as follows.

TH1 for the reception level: Those perch channels corresponding to the uplink control channels for which the reception level is not over this threshold value TH1 can possibly be selected as a perch channel of a newly provided base station. Consequently, this threshold value TH1 should preferably be set to a value close to the lowest level that can possibly be received. In the first embodiment, this threshold value is set equal to 0 dB for example, but in practice, this threshold value TH1 can be set so low that all the receivable uplink control channels can have the reception level over this threshold value TH1.

TH2 for the frequency: This frequency affects the interference between identical perch channels and the perch channel reuse efficiency. When this frequency is set larger, the interference between identical perch channels becomes larger but the perch channel reuse efficiency becomes higher. On the other hand, when this frequency is set smaller, the interference between identical perch channels becomes smaller but the perch channel reuse efficiency becomes lower. In the first embodiment, this threshold value is set equal to 2% for example, but in practice, an optimum setting of this threshold value TH2 should be determined in view of these conflicting factors.

TH3 for the reception level: This threshold value TH3 should be set sufficiently high so that the base stations corresponding to the uplink control channels for which the reception level is over this threshold value TH3 can be candidates for a handover target base station. In the first embodiment, this threshold value TH3 is set equal to 10 dB for example.

TH4 for the frequency: This threshold value TH4 should be set sufficiently high so that the base stations corresponding to the uplink control channels for which the frequency for having the reception level over the threshold value TH3 is over this threshold value TH4 can be candidates for a handover target base station. In the first embodiment, this threshold value TH4 is set equal to 10% for example.

TH5 for the reception level: When the mobile station can simultaneously receive signals from the newly provided base station and a base station for which the perch channel reception level is not over this threshold value TH5, the interference between identical perch channels could be caused, because the perch channel of the newly provided base station is to be selected from those for which the perch channel reception level is not over this threshold value TH5. Consequently, this threshold value TH5 should preferably be set to a value close to the lowest level that can possibly be received, so as to reuse the perch channel allocated to a base station which is so distanced from the newly provided base station that the perch channel of this base station is not receivable at the newly provided base station. In the second embodiment, this threshold value is set equal to 0 dB for example, but in practice, this threshold value TH5 can be set so low that all the receivable perch channels can have the reception level over this threshold value TH5.

TH6 for the reception level: This threshold value TH6 can practically be set equal to the threshold value TH7. In the second embodiment, this threshold value TH6 is set equal to 10 dB for example.

TH7 for the reception level: The perch channels for which the reception level is over this threshold value TH7 are to be entered into the perch channel list to be signaled by the newly provided base station. Consequently, this threshold value TH7 should be set sufficiently high so that the handover to a base station corresponding to the perch channel with the reception level over this threshold value TH7 is possible. In the second embodiment, this threshold value TH7 is set equal to 10 dB for example.

TH8 and TH9 for the reception level: These threshold values TH8 and TH9 are used to limit the perch channels for whose corresponding uplink control channels the reception level measurement should be carried out, according to the reception level measurement result of these perch channels. In the first embodiment, these threshold values TH8 and TH9 are set equal to 0 dB and 5 dB for example. In practice, the satisfactory operation can be realized by setting these threshold values TH8 and TH9 to the lowest level that can possibly be received, so that these threshold values TH8 and TH9 can be set so low that all the receivable perch channels can have the reception level over these threshold values TH8 and TH9.

According to the first embodiment described above, a newly provided base station can set up its own perch channel as a perch channel which does not interfere with the perch channels of the other base stations, and produce a perch channel list for the surrounding base stations, on a basis of the reception result of the uplink control channels through which signals are transmitted from the mobile stations to the surrounding base stations and which are corresponding to the perch channels of the surrounding base stations. Consequently, it is possible to set up a perch channel and a perch channel list for surrounding base stations at each newly provided base station autonomously and distributedly in accordance with the actual propagation states, without requiring an extra work load on a system designer. As a result, the perch channels can be arranged more efficiently, and a number of times for reusing the same perch channel can be reduced, so that a perch channel scan in an initial state can be made quicker and a transition to a waiting state can be made quicker.

In addition, according to the first embodiment described above, each already operating base station can measure the reception levels of the signals transmitted by the mobile stations by scanning the uplink control channels corresponding to the perch channels, and carry out the re-setting of the perch channel list to be signaled by that base station accordingly. Consequently, a perch channel of a newly provided base station can be automatically entered into the perch channel lists of the surrounding base station, without requiring an extra work load on a system designer.

Alternatively, according to the first embodiment described above, each already operating base station can measure the reception levels of the perch channels through which signals are transmitted by the surrounding base stations, and carry out the re-setting of the perch channel list to be signaled by that base station accordingly. Consequently, a perch channel of a newly provided base station can be automatically entered into the perch channel lists of the surrounding base station, without requiring an extra work load on a system designer.

Moreover, according to the first embodiment described above, each of a newly provided base station and each already operating base station can carry out the perch channel reception first so as to limit the uplink control channels to be received. Consequently, it becomes possible to measure the reception level at high precision in short time, and it becomes possible to realize the perch channel arrangement with a high reuse efficiency in short time.

Furthermore, according to the first embodiment described above, when a newly provided base station sets up the perch channel list, or when each already operating base station changes the perch channel list, the perch channel of that base station can be notified through a network to the surrounding base stations whose perch channels are contained in the perch channel list of that base station, so as to make the scanning by the already operating base station unnecessary.

On the other hand, according to the second embodiment described above, a newly provided base station can measure the reception levels of the perch channels through which signals are transmitted by the surrounding base stations while receiving the perch channel lists signaled by the surrounding base stations, and set up the perch channel of this newly provided base station while producing a perch channel list for the surrounding base stations accordingly. Consequently, it is possible to set up a perch channel and a perch channel list for surrounding base stations at each newly provided base station autonomously and distributedly in short time, without requiring an extra work load on a system designer. As a result, the perch channels can be arranged more efficiently, and a number of times for reusing the same perch channel can be reduced, so that a perch channel scan in an initial state can be made quicker and a transition to a waiting state can be made quicker.

In addition, according to the second embodiment described above, each already operating base station can measure the reception levels of the perch channels through which signals are transmitted by the surrounding base stations, and carry out the re-setting of the perch channel list to be signaled by that base station accordingly. Consequently, a perch channel of a newly provided base station can be automatically entered into the perch channel lists of the surrounding base station, without requiring an extra work load on a system designer.

Furthermore, according to the second embodiment described above, when a newly provided base station sets up the perch channel list, or when each already operating base station changes the perch channel list, the perch channel of that base station can be notified through a network to the surrounding base stations whose perch channels are contained in the perch channel list of that base station, so as to make the scanning by the already operating base station unnecessary.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for setting up perch channels in a mobile communication by a cellular system having a plurality of base stations including a newly provided base station and mobile stations, the method comprising the steps of:

measuring reception levels of signals transmitted by mobile stations to surrounding base stations at the newly provided base station by scanning uplink control channels corresponding to perch channels; and setting a perch channel of the newly provided base station and a perch channel list to be signaled by the newly provided base station, autonomously at the newly provided base station, according to the reception levels measured at the measuring step.

2. The method of claim 1, wherein the setting step sets the perch channel of the newly provided base station by obtaining a frequency for having a measured reception level over a prescribed threshold value TH1 for each uplink control channel, and selecting one perch channel from perch channels other than those corresponding to those uplink control channels for which the obtained frequency is over a prescribed threshold value TH2, as the perch channel of the newly provided base station.

3. The method of claim 1, wherein the setting step sets the perch channel list to be signaled by the newly provided base station by obtaining a frequency for having a measured reception level over a prescribed threshold value TH3 for each uplink control channel, and setting perch channels corresponding to those uplink control channels for which the obtained frequency is over a prescribed threshold value TH4 into the perch channel list to be signaled by the newly provided base station.

4. The method of claim 1, further comprising the steps of:

measuring reception levels of signals transmitted by mobile stations to surrounding base stations at each already operating base station by scanning uplink control channels corresponding to perch channels; and re-setting at each already operating base station a perch channel list to be signaled by each already operating base station, by obtaining a frequency for having a measured reception level over a prescribed threshold value TH3 for each uplink control channel at each already operating base station, and setting perch channels corresponding to those uplink control channels for which the obtained frequency is over a prescribed threshold value TH4 into the perch channel list to be signaled by each already operating base station.

5. The method of claim 4, further comprising the steps of:

measuring reception levels of signals transmitted through perch channels by surrounding base stations at each already operating base station by scanning the perch channels before scanning the uplink control channels; and limiting the uplink control channels to be scanned at each already operating base station to those corresponding to perch channels for which a measured reception level is over a prescribed threshold value TH8 and perch channels contained in perch channel lists signaled by those surrounding base stations which are using perch channels for which a measured reception level is over a prescribed threshold value TH9.

6. The method of claim 1, further comprising the steps of:

measuring reception levels of signals transmitted through perch channels by surrounding base stations at the newly provided base station by scanning the perch channels before scanning the uplink control channels; and limiting the uplink control channels to be scanned at the newly provided base station to those corresponding to perch channels for which a measured reception level is over a prescribed threshold value TH8 and perch channels contained in perch channel lists signaled by those surrounding base stations which are using perch channels for which a measured reception level is over a prescribed threshold value TH9.

7. The method of claim 1, further comprising the steps of:

measuring reception levels of signals transmitted through perch channels by surrounding base stations at each already operating base station; and re-setting at each already operating base station a perch channel list to be signaled by each already operating base station, by setting perch channels for which a measured reception level is over a prescribed threshold value TH7 into the perch channel list to be signaled by each already operating base station.

8. The method of claim 1, further comprising the steps of:

selecting base stations using perch channels contained in said perch channel list;

notifying each selected base station of the newly provided base station's perch channel by sending a notification from the newly provided base station to the selected base stations via a network; and adding the perch channel of the newly provided base station notified at the notifying step into the perch channel list to be signaled by each of the selected base stations.

9. A method for setting up perch channels in a mobile communication by a cellular system having a plurality of base stations including a newly provided base station and mobile stations, the method comprising the steps of:

measuring reception levels of signals transmitted through perch channels by surrounding base stations at the newly provided base station while receiving perch channel lists signaled by the surrounding base stations; and setting a perch channel of the newly provided base station and a perch channel list to be signaled by the newly provided base station, autonomously at the newly provided base station, according to the reception levels and the perch channel lists of the surrounding base stations obtained at the measuring step.

10. The method of claim 9, wherein the setting step sets the perch channel of the newly provided base station by selecting one perch channel from perch channels other than those for which a measured reception level is over a prescribed threshold value TH5 and those contained in perch channel lists signaled by those surrounding base stations which are using perch channels for which a measured reception level is over a prescribed threshold value TH6, as the perch channel of the newly provided base station.

11. The method of claim 9, wherein the setting step sets the perch channel list to be signaled by the newly provided base station by setting perch channels for which a measured reception level is over a prescribed threshold value TH7 into the perch channel list to be signaled by the newly provided base station.

12. The method of claim 9, further comprising the steps of:

measuring reception levels of signals transmitted through perch channels by surrounding base stations at each already operating base station; and re-setting at each already operating base station a perch channel list to be signaled by each already operating base station, by setting perch channels for which a measured reception level is over a prescribed threshold value TH7 into the perch channel list to be signaled by each already operating base station.

13. The method of claim 9, further comprising the steps of:

notifying the perch channel of the newly provided base station set at the setting step from the newly provided base station through a network to selected base stations which are using perch channels contained in the perch channel list to be signaled by the newly provided base station set by the setting step; and adding the perch channel of the newly provided base station notified at the notifying step into the perch channel list to be signaled by each of the selected base stations.

14. A base station apparatus to be used as a newly provided base station in a mobile communication by a cellular system having a plurality of base stations and mobile stations, the apparatus comprising:

transmitter and receiver means for realizing functions of a base station in the cellular system;

measurement means for measuring reception levels of signals transmitted by mobile stations to surrounding base stations by scanning uplink control channels corresponding to perch channels; and control means for setting a perch channel of the newly provided base station and a perch channel list to be signaled by the newly provided base station, autonomously at the newly provided base station, according to the reception levels measured by the measurement means.

15. The apparatus of claim 14, wherein the control means sets the perch channel of the newly provided base station by obtaining a frequency for having a measured reception level over a prescribed threshold value TH1 for each uplink control channel, and selecting one perch channel from perch channels other than those corresponding to those uplink control channels for which the obtained frequency is over a prescribed threshold value TH2, as the perch channel of the newly provided base station.

16. The apparatus of claim 14, wherein the control means sets the perch channel list to be signaled by the newly provided base station by obtaining a frequency for having a measured reception level over a prescribed threshold value TH3 for each uplink control channel, and setting perch channels corresponding to those uplink control channels for which the obtained frequency is over a prescribed threshold value TH4 into the perch channel list to be signaled by the newly provided base station.

17. The apparatus of claim 14, wherein the measurement means also measures reception levels of signals transmitted through perch channels by the surrounding base stations by scanning the perch channels before scanning the uplink control channels, and the control means also limits the uplink control channels to be scanned by the measurement means to those corresponding to perch channels for which a measured reception level is over a prescribed threshold value TH8 and perch channels contained in perch channel lists signaled by those surrounding base stations which are using perch channels for which a measured reception level is over a prescribed threshold value TH9.

18. The apparatus of claim 14, wherein the control means also comprises, means for selecting base stations using perch channels contained in said perch channel list, and means for notifying each selected base station of the newly provided base station's perch channel by sending a notification from the newly provided base station to the selected base stations via a network.

19. A base station apparatus to be used as an already operating base station in a mobile communication by a cellular system having a plurality of base stations including a newly provided base station and mobile stations, the apparatus comprising:

transmitter and receiver means for realizing functions of a base station in the cellular system;

measurement means for measuring reception levels of signals transmitted by mobile stations to surrounding base stations by scanning uplink control channels corresponding to perch channels; and control means for re-setting a perch channel list to be signaled by said already operating base station, by obtaining a frequency for having a measured reception level over a prescribed threshold value TH3 for each uplink control channel, and setting perch channels corresponding to those uplink control channels for which the obtained frequency is over a prescribed threshold value TH4 into the perch channel list to be signaled by said already operating base station.

20. The apparatus of claim 19, wherein the measurement means also measures reception levels of signals transmitted through perch channels by the surrounding base stations by scanning the perch channels before scanning the uplink control channels, and the control means also limits the uplink control channels to be scanned by the measurement means to those corresponding to perch channels for which a measured reception level is over a prescribed threshold value TH8 and perch channels contained in perch channel lists signaled by those surrounding base stations which are using perch channels for which a measured reception level is over a prescribed threshold value TH9.

21. A base station apparatus to be used as an already operating base station in a mobile communication by a cellular system having a plurality of base stations including a newly provided base station and mobile stations, the apparatus comprising:

transmitter and receiver means for realizing functions of a base station in the cellular system;

measurement means for measuring reception levels of signals transmitted through perch channels by surrounding base stations; and control means for re-setting a perch channel list to be signaled by said already operating base station, by setting perch channels for which a measured reception level, is over a prescribed threshold value TH7 into the perch channel list to be signaled by said already operating base station.

22. A base station apparatus to be used as a newly provided base station in a mobile communication by a cellular system having a plurality of base stations and mobile stations, the apparatus comprising:

transmitter and receiver means for realizing functions of a base station in the cellular system;

measurement means for measuring reception levels of signals transmitted through perch channels by surrounding base stations while receiving perch channel lists signaled by the surrounding base stations; and control means for setting a perch channel of the newly provided base station and a perch channel list to be signaled by the newly provided base station, autonomously at the newly provided base station, according to the reception levels and the perch channel lists of the surrounding base stations obtained by the measurement means.

23. The apparatus of claim 22, wherein the control means sets the perch channel of the newly provided base station by selecting one perch channel from perch channels other than those for which a measured reception level is over a prescribed threshold value TH5 and those contained in perch channel lists signaled by those surrounding base stations which are using perch channels for which a measured reception level is over a prescribed threshold value TH6, as the perch channel of the newly provided base station.

24. The apparatus of claim 22, wherein the control means sets the perch channel list to be signaled by the newly provided base station by setting perch channels for which a measured reception level is over a prescribed threshold value TH7 into the perch channel list to be signaled by the newly provided base station.

25. The apparatus of claim 22, wherein the control means also notifies the perch channel of the newly provided base station through a network to selected base stations which are using perch channels contained in the perch channel list to be signaled by the newly provided base station, so that the notified perch channel of the newly provided base station is added into the perch channel list to be signaled by each of the selected base stations.

* * * * *